US011151090B2

(12) United States Patent
Chamarthy et al.

(10) Patent No.: US 11,151,090 B2
(45) Date of Patent: Oct. 19, 2021

(54) SNAPSHOT MANAGEMENT BASED ON DATA CHURN DELTA

(71) Applicant: EMC IP Holding Company LLC, Hopkinton, MA (US)

(72) Inventors: Srinivasa Chamarthy, Karnataka (IN); Animesh Singh, Bangalore (IN); Joji John, Bangalore (IN); Vetrivel M, Tiruppur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 109 days.

(21) Appl. No.: 16/656,332

(22) Filed: Oct. 17, 2019

(65) Prior Publication Data
US 2021/0117390 A1 Apr. 22, 2021

(51) Int. Cl.
G06F 16/17 (2019.01)
G06F 16/174 (2019.01)
G06F 11/34 (2006.01)
G06F 11/14 (2006.01)
G06F 16/11 (2019.01)

(52) U.S. Cl.
CPC ...... *G06F 16/1756* (2019.01); *G06F 11/1453* (2013.01); *G06F 11/3452* (2013.01); *G06F 16/128* (2019.01)

(58) Field of Classification Search
CPC .................................................. G06F 16/10
See application file for complete search history.

(56) References Cited

U.S. PATENT DOCUMENTS

| | | | |
|---|---|---|---|
| 7,296,125 | B2 | 11/2007 | Ohran |
| 8,051,260 | B1 | 11/2011 | Mcclure et al. |
| 8,706,833 | B1 | 4/2014 | Bergant et al. |
| 9,772,910 | B1 | 9/2017 | Wigmore et al. |
| 9,928,246 | B1 | 3/2018 | Xu et al. |
| 10,203,904 | B1 | 2/2019 | Natanzon et al. |
| 10,248,326 | B2 | 4/2019 | Danilov et al. |
| 10,284,507 | B1 | 5/2019 | Ambaljeri et al. |
| 10,303,664 | B1 | 5/2019 | Tetreault et al. |
| 10,372,554 | B1 | 8/2019 | Natanzon et al. |
| 10,650,146 | B1 * | 5/2020 | Gaurav ............ G06F 21/562 |
| 2008/0256311 | A1 * | 10/2008 | Lee ................. G06F 3/0605 |
| | | | 711/162 |

(Continued)

*Primary Examiner* — Baoquoc N To
(74) *Attorney, Agent, or Firm* — BainwoodHuang

(57) ABSTRACT

Techniques for managing snapshots of a storage object in a data storage system based on the data churn delta between the latest snapshot and the current data of the storage object. The techniques include, having specified minimum and maximum data loss tolerances for a parent object, creating successive snapshots of the parent object, each snapshot being created at a scheduled time interval or a time when the minimum data loss tolerance has been reached/exceeded. The techniques include obtaining the total data churn between the latest snapshot and the parent data, and determining whether the total data churn has reached or exceeded the maximum data loss tolerance. The techniques include, having determined that the total data churn has reached or exceeded the maximum data loss tolerance, retaining only those snapshots that have not exceeded the maximum data loss tolerance, and discarding all snapshots that have exceeded the maximum data loss tolerance.

15 Claims, 3 Drawing Sheets

(56) References Cited

U.S. PATENT DOCUMENTS

2009/0300303 A1\* 12/2009 Balasubramanian ........................ G06F 11/1448
  711/162

\* cited by examiner

SNAPSHOT MANAGEMENT BASED ON DATA CHURN DELTA

BACKGROUND

Data storage systems employ various data protection schemes ranging from local data protection schemes to schemes for recovery from disasters. Such data protection schemes typically create copies of production data for retention on secondary (or backup) storage systems, which can be situated at the same locations as production storage systems or locations remote from the production storage systems. Such copies of production data can be point-in-time (PIT) copies (also referred to herein as "snapshots") created at scheduled time intervals. When a new snapshot of production data is created at its scheduled time, at least one older snapshot of the production data on a secondary storage system may become obsolete. Once an older snapshot has been successfully refreshed by a new snapshot, the older, possibly obsolete snapshot may be deleted from the secondary storage system or retained on the secondary storage system up to the date of its expiration.

SUMMARY

Data protection schemes typically implement snapshot policies, which can specify scheduled time intervals for snapshot creation ranging from hourly to weekly, dates for snapshot expiration ranging from hours to years, minimum numbers of snapshots for retention, low quota policies, and so on. For example, a low quota policy can be implemented when the available free storage space on a secondary (or backup) storage system becomes less than a certain percentage of storage space needed to retain a snapshot of a production data set (also referred to herein as a "storage object(s)"). Such a snapshot can be an application-level snapshot, a file-level snapshot, or a block-level snapshot. Further, rather than replicate a full copy of a storage object, a snapshot can replicate just the differences between a current version of the storage object and a prior version of the storage object that existed at the time when a snapshot of the storage object was last created. Multiple snapshots of a storage object can also be created at different times for retention on the secondary storage system.

Unfortunately, there are drawbacks to the typical data protection schemes that create snapshots of storage objects at scheduled time intervals. For example, such data protection schemes are strictly time-based, and fail to consider the amount of data churn of a parent storage object (also referred to herein as a "parent object") that may have occurred up to or after the time when a snapshot of the parent object was created. As employed herein, the term "data churn" refers to the difference or change in data of a storage object with respect to two versions (e.g., a current version, a snapshot version) of the storage object at different points-in-time, or the difference or change in data on the parent object with respective to the latest point-in-time (PIT) copy. Such a failure to consider the data churn of a parent object can result in the creation of a snapshot of the parent object at a time when little or no data churn has occurred or when a large amount of data churn has occurred, which suggests that the scheduled time intervals (also referred to herein as the "time delta") for snapshot creation may be either too short or too long.

Such data protection schemes also fail to consider the amount of data churn when implementing snapshot policies. For example, the amount of data churn that may have occurred between a parent object and its respective snapshots (also referred to herein as the "data churn delta") can provide indications of the relative values of the respective snapshots to a data storage customer. If the amount of data churn delta between a parent object and a snapshot of the parent object is large, then the snapshot may end up being retained on a secondary (or backup) storage system until its expiration date, even though it may have little or no value. Older snapshots that have expired may also end up being deleted from the secondary storage system without any consideration of their current value. The lack of visibility of the amount of data churn delta between a parent object and its respective snapshots can also influence snapshot policy decision making, particularly with regard to snapshot retention and/or harvesting.

Techniques are disclosed herein for managing snapshots of a storage object in a data storage system based on an amount of data churn delta between the storage object and the respective snapshots of the storage object. The disclosed techniques allow data storage customers to establish snapshot policies that consider not only scheduled time intervals for creating snapshots of a parent object (i.e., the time delta), but also the amount of data churn that has occurred between the parent object and its respective latest snapshot (i.e., the data churn delta). Such snapshot policies can specify a scheduled time interval for creating snapshots of a parent object, as well as minimum and maximum data loss tolerances for the parent object, allowing snapshot retention and/or harvesting decisions to be made based at least on whether such minimum/maximum data loss tolerances have been reached and/or exceeded. The disclosed techniques can include, once minimum and maximum data loss tolerances for a parent object have been specified, creating a plurality of snapshots of the parent object, in which each snapshot is created either at a scheduled time interval or at a time when the minimum data loss tolerance has been reached or exceeded. The disclosed techniques can further include obtaining the total data churn of the parent object in relation to two or more newer snapshots among the plurality of snapshots and determining whether the total data churn has reached or exceeded the maximum data loss tolerance. The disclosed techniques can further include, having determined that the total data churn has reached or exceeded the maximum data loss tolerance, retaining the two or more newer snapshots, and archiving, discarding, or moving to a lower performance tier at least one older snapshot among the plurality of snapshots created at a time earlier than the two or more newer snapshots.

By specifying minimum and maximum data loss tolerances for a parent object, creating at least one snapshot among a plurality of snapshots of the parent object in response to a data churn of the parent object having reached or exceeded the minimum data loss tolerance, and archiving, discarding, or moving to a lower performance tier at least one older snapshot among the plurality of snapshots based on whether the total data churn of the parent object in relation to two or more newer snapshots among the plurality of snapshots has reached or exceeded the maximum data loss tolerance, the amount of data loss for a production storage system resulting from performing backup/restore operations can be decreased, and snapshot storage requirements on a secondary (or backup) storage system can be reduced. Although the disclosed techniques are described herein with reference to snapshots as the data protection mechanism, it should be understood that the disclosed techniques are applicable for use with any suitable pointin-time (PIT) data protection mechanism, including snapshots, asynchronous replication, scheduled backups, and so on.

In certain embodiments, a method of managing copies of storage objects in a data storage system includes specifying a minimum data loss tolerance and a maximum data loss tolerance for a storage object, creating at least one copy among a plurality of copies of the storage object in response to a data churn of the storage object having reached or exceeded the minimum data loss tolerance, and discarding at least one older copy among the plurality of copies of the storage object based on whether a total data churn of the storage object in relation to two or more newer copies among the plurality of copies has reached or exceeded the maximum data loss tolerance.

In certain arrangements, the method includes determining the data churn of the storage object, the data churn of the storage object corresponding to a change in data of the storage object up to or after a time when the at least one copy of the storage object was created.

In certain arrangements, the method includes monitoring, during at least one predetermined time interval, the data churn of the storage object in relation to a respective copy among the plurality of copies of the storage object.

In certain arrangements, the method includes creating, during the at least one predetermined time interval, the at least one copy in response to the monitored data churn of the storage object having reached or exceeded the minimum data loss tolerance, the at least one predetermined time interval corresponding to at least one scheduled time interval for creating the at least one copy of the storage object.

In certain arrangements, the method includes creating at least one additional copy among the plurality of copies of the storage object at one or more of a beginning and an end of the scheduled time interval.

In certain arrangements, the method includes determining the total data churn of the storage object in relation to the two or more newer copies of the storage object, the total data churn of the storage object corresponding to a sum of at least (i) a first data churn of the storage object in relation to a first one of the two or more newer copies and (ii) a second data churn of the storage object in relation to a second one of the two or more newer copies.

In certain arrangements, the method includes monitoring, at predetermined time intervals, the total data churn of the storage object in relation to the two or more newer copies of the storage object.

In certain arrangements, the method includes one or more of (i) deleting the at least one older copy of the storage object from the data storage system, (ii) storing the at least one older copy of the storage object in a remote data storage system, and (iii) moving the at least one older copy of the storage object from a higher performance tier of the data storage system to a lower performance tier of the data storage system.

In certain embodiments, a data storage system includes a memory, and storage processing circuitry configured to execute program instructions out of the memory to specify a minimum data loss tolerance and a maximum data loss tolerance for a storage object, to create at least one copy among a plurality of copies of the storage object in response to a data churn of the storage object having reached or exceeded the minimum data loss tolerance, and to discard at least one older copy among the plurality of copies of the storage object based on whether a total data churn of the storage object in relation to two or more newer copies among the plurality of copies has reached or exceeded the maximum data loss tolerance.

In certain arrangements, the storage processing circuitry is further configured to execute the program instructions out of the memory to determine the total data churn of the storage object in relation to the two or more newer copies of the storage object, wherein the total data churn of the storage object corresponds to a sum of at least (i) a first data churn of the storage object in relation to a first one of the two or more newer copies and (ii) a second data churn of the storage object in relation to a second one of the two or more newer copies.

In certain embodiments, a computer program product includes a set of non-transitory, computer-readable media having instructions that, when executed by processing circuitry of a computerized apparatus, cause the processing circuitry to perform a method of managing copies of storage objects in a data storage system, in which the method includes specifying a minimum data loss tolerance and a maximum data loss tolerance for a storage object, creating at least one copy among a plurality of copies of the storage object in response to a data churn of the storage object having reached or exceeded the minimum data loss tolerance, and discarding at least one older copy among the plurality of copies of the storage object based on whether a total data churn of the storage object in relation to two or more newer copies among the plurality of copies has reached or exceeded the maximum data loss tolerance.

In certain arrangements of the computer program product, the method includes determining the total data churn of the storage object in relation to the two or more newer copies of the storage object, the total data churn of the storage object corresponding to a sum of at least (i) a first data churn of the storage object in relation to a first one of the two or more newer copies and (ii) a second data churn of the storage object in relation to a second one of the two or more newer copies.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for managing snapshots of a storage object in a data storage system based on the amount of data churn delta between the latest snapshot and the current data of the storage object. The disclosed techniques can include, once minimum and maximum data loss tolerances for a parent storage object (also referred to herein as a "parent object") have been specified, creating a plurality of successive snapshots of the parent object, in which each successive snapshot is created either at a scheduled time interval or at a time when the minimum data loss tolerance has been reached or exceeded. The disclosed techniques can further include obtaining the total data churn between the latest snapshot and the parent object data, and determining whether the total data churn has reached or exceeded the maximum data loss tolerance. The disclosed techniques can further include, having determined that the total data churn has reached or exceeded the maximum data loss tolerance, retaining only those snapshots that have not exceeded the maximum data loss tolerance, and archiving, discarding, or moving to a lower performance tier all snapshots that have exceeded the maximum data loss tolerance.

By specifying minimum and maximum data loss tolerances for a parent object, creating at least one snapshot among a plurality of snapshots of the parent object in response to a data churn of the parent object having reached or exceeded the minimum data loss tolerance, and archiving, discarding, or moving to a lower performance tier all snapshots that have exceeded the maximum data loss tolerance, the amount of data loss for a production storage system resulting from performing backup/restore operations can be decreased, and snapshot storage requirements on a secondary (or backup) storage system can be reduced.

Figure 1:
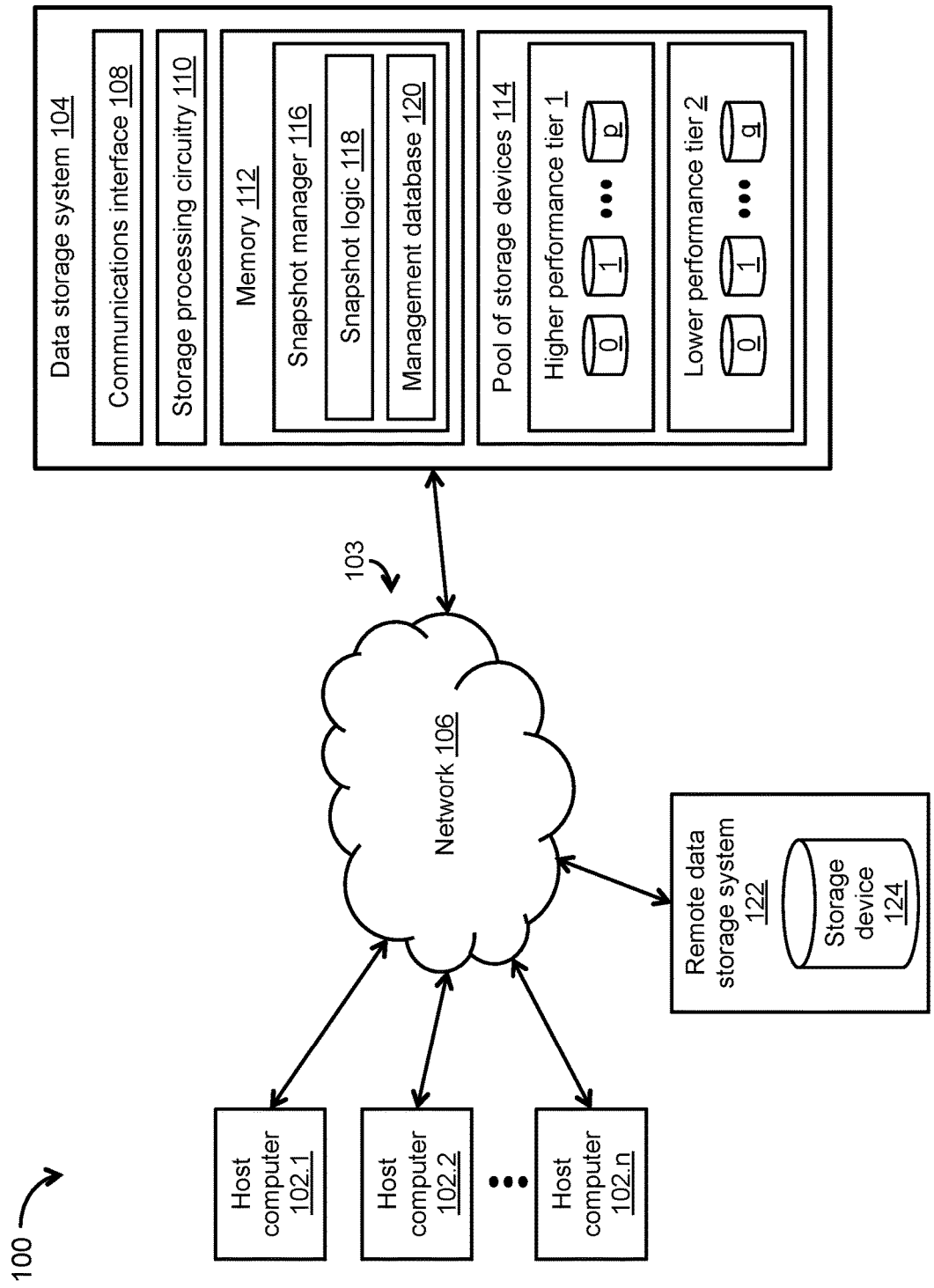
FIG. 1 is a block diagram of an exemplary data storage environment in which techniques can be practiced for managing snapshots of a storage object in a data storage system based on the amount of data churn delta between the storage object and the respective snapshots of the storage object.

FIG. 1 depicts an illustrative embodiment of an exemplary data storage environment 100 in which techniques can be practiced for managing snapshots of a storage object in a data storage system based on the amount of data churn delta between the storage object and the respective snapshots of the storage object. As shown in FIG. 1, the data storage environment 100 can include a plurality of host computers 102.1, 102.2, . . . , 102.n, a data storage system 104, a remote data storage system 122, and a communications medium 103 that includes at least one network 106. For example, each of the plurality of host computers 102.1, . . . , 102.n can be configured as a web server computer, a file server computer, an email server computer, an enterprise server computer, and/or any other suitable client/server computer or computerized device. The plurality of host computers 102.1, . . . , 102.n can be configured to provide, over the network 106, storage input/output (IO) requests (e.g., small computer system interface (SCSI) commands, network file system (NFS) commands) to the data storage system 104. For example, each such storage IO request (e.g., write request, read request) can direct the data storage system 104 to write or read data blocks, data pages, data files, and/or any other suitable data elements (also referred to herein as "host data") to/from virtual volumes (e.g., VMware® virtual volumes (VVOLs)), logical units (LUs), file systems, and/or any other suitable storage objects maintained in association with the data storage system 104.

The communications medium 103 can be configured to interconnect the plurality of host computers 102.1, . . . , 102.n and the data storage system 104 to enable them to communicate and exchange data and/or control signaling. As shown in FIG. 1, the communications medium 103 is illustrated as a "cloud" to represent different communications topologies such as a backbone topology, a hub-and-spoke topology, a loop topology, an irregular topology, and so on, or any suitable combination thereof. As such, the communications medium 103 can include copper based data communications devices and cabling, fiber optic based communications devices and cabling, wireless communications devices, and so on, or any suitable combination thereof. Further, the communications medium 103 can be configured to support storage area network (SAN) communications, network attached storage (NAS) communications, local area network (LAN) communications, metropolitan area network (MAN) communications, wide area network (WAN) communications, wireless communications, distributed infrastructure communications, and/or any other suitable communications.

The data storage system 104 can include a communications interface 108, storage processing circuitry 110, a memory 112, and a pool of storage devices 114. The communications interface 108 can include SCSI target adapters, network interface adapters, and/or any other suitable adapters for converting electronic, optical, and/or wireless signals received over the network 106 to a form suitable for use by the storage processing circuitry 110. The memory 112 can include persistent memory (e.g., flash memory, magnetic memory) and/or non-persistent memory (e.g., dynamic random access memory (DRAM), static random access memory (SRAM)). Further, the memory 112 can accommodate a plurality of specialized software modules and/or logical constructs including a snapshot manager 116. The storage processing circuitry 110 can include one or more physical storage processors and/or engines configured to execute the specialized software modules and/or logical constructs, data movers, director boards, blades, IO modules, storage drive controllers, switches, and/or any other suitable computer hardware or combination thereof. For example, the storage processing circuitry 110 can execute such specialized software modules/logical constructs as program instructions out of the memory 112, process storage IO requests (e.g., write requests, read requests) issued by the respective host computers 102.1, . . . , 102.n, and/or store host data in any suitable data storage environment (e.g., a clustered or de-clustered Redundant Array of Inexpensive/Independent Disks (RAID) environment) implemented by the pool of storage devices 114.

In the context of the storage processing circuitry 110 being implemented using one or more processors executing specialized software modules/logical constructs, a computer program product can be configured to deliver all or a portion of the specialized software modules/logical constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques disclosed herein.

The pool of storage devices 114 can be organized into multiple storage tiers, grades, or levels, such as a higher performance tier "1" including a plurality of storage devices 0, 1, . . . , p and a lower performance tier "2" including a plurality of storage devices 0, 1, . . . , q. The respective higher and lower performance tiers 1, 2 can be associated with storage devices that provide different quality of service (QoS) levels, performance capabilities, and/or costs. For example, the higher performance tier "1" can correspond to a "gold" storage tier associated with higher cost, higher performance, flash-based storage devices that provide a higher level of QoS. Further, the lower performance tier "2" can correspond to a "bronze" storage tier associated with lower cost, lower performance, hard disk-based storage devices that provide a lower level of QoS.

The snapshot manager 116 can include snapshot logic 118 and a management database 120. The snapshot logic 118 can be configured to service backup requests for performing full or incremental backups of storage objects (e.g., VVOLs, LUs, file systems) based on snapshot policies for the respective storage objects. The snapshot logic 118 can service such backup requests by performing a "redirect-on-write" operation, a "copy-on-write" operation, or any other suitable backup operation. For example, if a backup request is to be serviced at a point-in-time (PIT) when one or more data blocks of a storage object (e.g., a production VVOL) are not subject to being modified by a write request, then the snapshot logic 118 can capture or otherwise create a block-level snapshot of the production VVOL by storing snapshot metadata that refers to the original data blocks of the production VVOL. As employed herein, the term "snapshot" refers to a PIT replica or copy of a storage object (e.g., VVOL, LU, file system) along with its associated snapshot metadata. Such a snapshot can be a replica or copy of a full copy of the storage object, or a space-efficient copy that stores differences between a current version of the storage object and a prior version that existed at the time when a snapshot was last captured or created. If a backup request is to be serviced at a PIT when one or more data blocks of the production VVOL are subject to being modified by a write request, then the snapshot logic 118 can capture or create a snapshot of the production VVOL by performing a redirect-on-write operation, which can include redirecting the write request to newly allocated space for the data block(s) on the production VVOL, writing new block data to the newly allocated space, and storing snapshot metadata that refers to the original unmodified data block(s) on the production VVOL.

The management database 120 (and/or one or more storage devices in the higher performance tier "1" or the lower performance tier "2") can be configured to store snapshot metadata, snapshot expiration dates, the network configuration of the local and remote data storage systems 104, 122, the locations of storage objects and snapshots within the local and/or remote data storage systems 104, 122, one or more schedules specifying time intervals for creating snapshots of the various storage objects, and/or any other suitable data or information. The remote data storage system 122 can be configured to provide backup, restore, and/or archive functions for the various storage objects within the data storage environment 100, using at least one remote storage device 124. It is noted that the remote storage device 124 can be used in association with one or more other discrete data stores situated at the same location as the data storage system 104 or locations remote from the data storage system 104 (e.g., in cloud storage).

During operation, the data storage system 104 can perform the various techniques disclosed herein for managing snapshots of a storage object based on the amount of data churn delta between the storage object and the respective snapshots of the storage object. The disclosed techniques allow data storage customers to establish snapshot policies that consider not only scheduled time intervals for creating snapshots of a parent object (i.e., the time delta), but also the amount of data churn that has occurred between the parent object and its respective latest snapshot (i.e., the data churn delta). Such snapshot policies can specify a scheduled time interval for creating snapshots of a parent object, as well as minimum and maximum data loss tolerances for the parent object, allowing snapshot retention and/or harvesting decisions to be made based at least on whether such minimum/maximum data loss tolerances have been reached and/or exceeded. As employed herein, the term "data churn" refers to the difference or change in data of a storage object with respect to two versions (e.g., a current version, a snapshot version) of the storage object at different points-in-time, or the difference or change in data on the parent object with respective to the latest point-in-time (PIT) copy. In one embodiment, the snapshot logic 118 can be configured to calculate, derive, determine, or otherwise obtain data churn values, deltas, or percentages for a parent object. For example, the snapshot logic 118 can obtain such data churn values/deltas/percentages by using an application programming interface (API) such as the "snap differential" or "snap_diff" API, which can obtain differences between a current version and a snapshot version of a parent object to determine which data elements (or percentage thereof) have changed since a last backup of the parent object (e.g., since the creation of the latest or newest snapshot). It is noted that the amount of data churn can also be obtained in response to a redirect-on-write operation, in which the amount of data churn corresponds to the amount of data of the parent object that was redirected.

The disclosed techniques performed by the data storage system 104 can include, once minimum and maximum data loss tolerances for a parent object have been specified, creating a plurality of snapshots of the parent object, in which each snapshot is created either at a scheduled time interval or at a time when the minimum data loss tolerance has been reached or exceeded. The disclosed techniques can further include obtaining the total data churn of the parent object in relation to two or more newer snapshots among the plurality of snapshots, and determining whether the total data churn has reached or exceeded the maximum data loss tolerance. The disclosed techniques can further include, having determined that the total data churn has reached or exceeded the maximum data loss tolerance, retaining the two or more newer snapshots, and archiving, discarding, or moving to a lower performance tier at least one older snapshot among the plurality of snapshots created at a time earlier than the two or more newer snapshots.

Figures 2A, 2B:
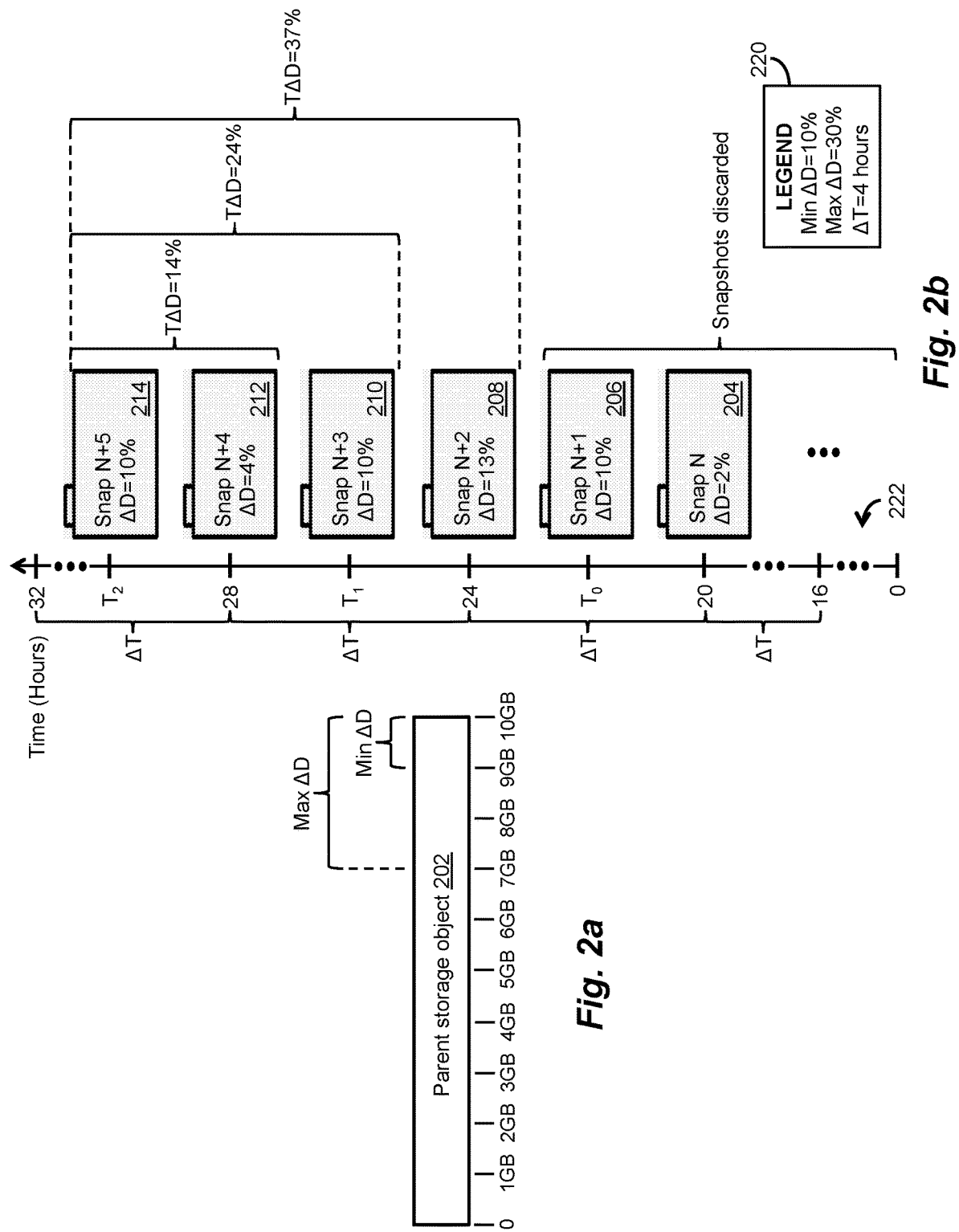
FIG. 2a is a block diagram of an exemplary representation of a parent storage object, illustrating specified minimum and maximum data loss tolerances for the parent storage object.
FIG. 2b is a diagram of a plurality of exemplary successive snapshots of the parent storage object of FIG. 2a, illustrating scheduled time intervals for creating some of the plurality of successive snapshots, the amount of data churn of the parent storage object that occurred up to or after the time when each successive snapshot was created, and the total data churn of the parent storage object in relation to several groups of two or more newer snapshots among the plurality of successive snapshots.

The disclosed techniques for managing snapshots of a storage object based on the amount of data churn delta between the storage object and the respective snapshots of the storage object will be further understood with reference to the following illustrative example, as well as FIGS. 2a and 2b. In this example, it is assumed that a data storage customer has established a snapshot policy, which includes at least an identifier of a parent storage object ("parent object") 202 (see FIG. 2a), a scheduled time interval for creating snapshots of the parent object 202, a minimum data loss tolerance for the parent object 202, and a maximum data loss tolerance for the parent object 202. For example, in such a snapshot policy, the scheduled time interval ("ΔT") for creating snapshots can be four (4) hours or any other suitable time interval, the minimum data loss tolerance ("Min ΔD") for the parent object 202 can be ten percent (10%) or any other suitable minimum data loss tolerance, and the maximum data loss tolerance ("Max ΔD") for the parent object 202 can be thirty percent (30%) or any other suitable maximum data loss tolerance, as indicated in a legend 220 of FIG. 2b.

FIG. 2a depicts an exemplary representation of the parent object 202, which can be a VVOL, an LU, a file system, or any other suitable storage object. As shown in FIG. 2a, the parent object 202 can have a size equal to up to ten (10) gigabytes (GB) or any other suitable size. The minimum data loss tolerance (i.e., Min ΔD=10%) can therefore correspond to up to 1 GB worth of data of the parent object 202 (as illustrated by 1 GB of data in the range from 9 GB to 10 GB; see FIG. 2a), and the maximum data loss tolerance (i.e., Max ΔD=30%) can therefore correspond to up to 3 GB worth of data of the parent object 202 (as illustrated by 3 GB of data in the range from 7 GB to 10 GB; see FIG. 2a).

FIG. 2b depicts a plurality of successive snapshots of the parent object 202, including at least a snapshot ("Snap") "N" 204, a Snap "N+1" 206, a Snap "N+2" 208, a Snap "N+3" 210, a Snap "N+4" 212, and a Snap "N+5" 214, each of which can be created by operation of the snapshot logic 118 (see FIG. 1). In this example, it is assumed that the parent object 202 and the plurality of successive snapshots (e.g., Snap "N" 204, Snap "N+1" 206, Snap "N+2" 208, Snap "N+3" 210, Snap "N+4" 212, Snap "N+5" 214; see FIG. 2b) are initially stored in association with the higher performance tier "1" of the pool of storage devices 114 (see FIG. 1). It is further assumed that certain percentages of data elements (e.g., data blocks) of the parent object 202 are modified or changed by write requests during the time intervals occurring between the times that the Snaps 204, 206, 208, 210, 212, 214 are created. As shown in FIG. 2b, at the times of snapshot creation, the snapshot logic 118 calculates data churn percentages ("ΔD") for each respective Snap 204, 206, 208, 210, 212, or 214, in which the data churn percentage, ΔD, corresponds to the percentage change in data of the parent object 202 up to or after the time of creation of the respective Snap 204, 206, 208, 210, 212, or 214. The snapshot logic 118 also stores the calculated data churn percentages, ΔD, in snapshot metadata for the respective Snaps 204, 206, 208, 210, 212, 214. In this example, the data churn percentages, ΔD, up to or after the times of creation of the Snaps 204, 206, 208, 210, 212, and 214 are 2%, 10%, 13%, 10%, 4%, and 10%, respectively.

As described herein, the snapshot policy includes a scheduled time interval, ΔT, of four (4) hours for creating a snapshot of the parent object 202. As shown in FIG. 2b (with reference to a time axis 222), the scheduled time interval (i.e., ΔT=4 hours) occurs at least from sixteen (16) to twenty (20) hours, from twenty (20) to twenty-four (24) hours, from twenty-four (24) to twenty-eight (28) hours, and from twenty-eight (28) to thirty-two (32) hours. At least the Snap "N" 204, the Snap "N+2" 208, and the Snap "N+4" 212 are therefore created at the scheduled times of 20 hours, 24 hours, and 28 hours, respectively. As further described herein, certain percentages of data elements of the parent object 202 are modified or changed by write requests during the time intervals occurring between the times that the Snaps 204, 206, 208, 210, 212, 214 are created. Certain percentages of data elements of the parent object 202 are therefore modified or changed during at least the time intervals occurring between twenty (20) and twenty-four (24) hours, between twenty-four (24) and twenty-eight (28) hours, and between twenty-eight (28) and thirty-two (32) hours.

To decrease the amount of data loss for the parent object 202 that might result from performing a backup or restore operation, the snapshot logic 118 determines and monitors (e.g., periodically, or at regular or irregular time intervals) the percentage of data churn, ΔD, of the parent object 202 in relation to the latest (or newest) snapshot during at least the time intervals occurring between twenty (20) and twenty-four (24) hours, between twenty-four (24) and twenty-eight (28) hours, and between twenty-eight (28) and thirty-two (32) hours. Based on the monitored data churn percentages, ΔD, if it is determined that the minimum data loss tolerance (i.e., Min ΔD=10%) was reached or exceeded during a respective time interval, then the snapshot logic 118 creates a snapshot of the parent object 202 at the time when the minimum data loss tolerance was reached or exceeded. As shown in FIG. 2b (with reference to the time axis 222), the minimum data loss tolerance, Min ΔD, of 10% was reached at time "T0" during the time interval from twenty (20) to twenty-four (24) hours (i.e., when the percentage of data churn, ΔD, of the parent object 202 in relation to the Snap "N+1" 206 was equal to 10%). Likewise, the minimum data loss tolerance, Min ΔD, of 10% was reached at time "$T_1$" during the time interval from twenty-four (24) to twenty-eight (28) hours (i.e., when the percentage of data churn, ΔD, of the parent object 202 in relation to the Snap "N+3" 210 was equal to 10%), and at time "$T_2$" during the time interval from twenty-eight (28) to thirty-two (32) hours (i.e., when the percentage of data churn, ΔD, of the parent object 202 in relation to the Snap "N+5" 214 was equal to 10%). The snapshot logic 118 therefore creates the Snap "N+1" 206, the Snap "N+3" 210, and the Snap "N+5" 214 at the times "T0," "T1," and "T2," respectively.

In addition, to reduce snapshot storage requirements on the data storage system 104 and/or the remote data storage system 122, the snapshot logic 118 further determines and monitors (e.g., periodically, or at regular or irregular time intervals) the total data churn ("TAD") of the parent object 202 in relation to two or more newer snapshots among the plurality of successive snapshots (i.e., Snap "N" 204, Snap "N+1" 206, Snap "N+2" 208, Snap "N+3" 210, Snap "N+4" 212, Snap "N+5" 214; see FIG. 2b). If it is determined that the maximum data loss tolerance (i.e., Max ΔD=30%) was reached or exceeded, then the snapshot logic 118 causes the two or more newer snapshots to be retained, and further causes at least one older snapshot among the plurality of successive snapshots created at a time(s) earlier than the two or more newer snapshots to be archived, discarded, or moved to the lower performance tier "2" of the pool of storage devices 114 (see FIG. 1). In this example, newer snapshots of the parent object 202 are created at later times along the time axis 222, and older snapshots of the parent object 202 are created at earlier times along the time axis 222. It is also assumed that the Snap "N+5" 214 is the latest (or newest) snapshot among the plurality of successive snapshots of the parent object 202.

As shown in FIG. 2b, the data churn percentage, ΔD, of the parent object 202 in relation to the Snap "N+5" 214 is ten percent (10%), and the data churn percentage ("ΔD") of the parent object 202 in relation to the Snap "N+4" 212 is four percent (4%). The total data churn ("TAD") of the parent object 202 in relation to the Snap "N+5" 214 and the Snap "N+4" 212 is therefore equal to fourteen percent (10%+4%=14%), which is less than the maximum data loss tolerance, Max ΔD, of 30%. As further shown in FIG. 2b, the data churn percentage ("ΔD") of the parent object 202 in relation to the Snap "N+3" 210 is ten percent (10%). The total data churn ("TAD") of the parent object 202 in relation to the Snap "N+5" 214, the Snap "N+4" 212, and the Snap "N+3" 210 is therefore equal to twenty-four percent (10%+4%+10%=24%), which is also less than the maximum data loss tolerance, Max ΔD, of 30%.

However, as shown in FIG. 2b, the data churn percentage ("ΔD") of the parent object 202 in relation to the Snap "N+2" 208 is thirteen percent (13%). The total data churn ("TAD") of the parent object 202 in relation to the Snap "N+5" 214, the Snap "N+4" 212, the Snap "N+3" 210, and the Snap "N+2" 208 is therefore equal to thirty-seven percent (10%+4%+10%+13%=37%), which is greater than the maximum data loss tolerance, Max ΔD, of 30%. The snapshot logic 118 therefore causes the newer Snaps 208, 210, 212, 214 to be retained in the higher performance tier "1" of the pool of storage devices 114 (see FIG. 1), and further causes at least the older Snaps 204, 206 created at times earlier than the newer Snaps 208, 210, 212, 214 to be archived in the remote data storage system 122 (see FIG. 1), discarded, or moved to the lower performance tier "2" of the pool of storage devices 114.

Figure 3:
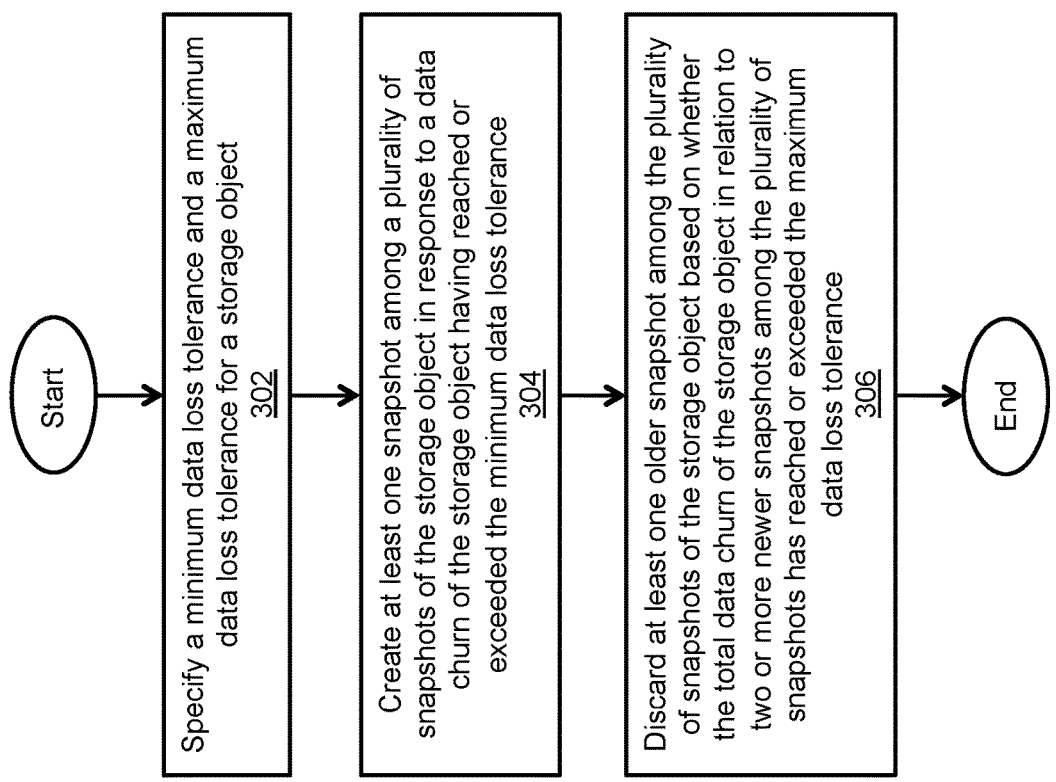
FIG. 3 is a flow diagram of an exemplary method of managing snapshots of a storage object in a data storage system based on the amount of data churn delta between the storage object and the respective snapshots of the storage object.

An exemplary method of managing snapshots of a storage object in a data storage system based on the amount of data churn delta between the storage object and the respective snapshots of the storage object is described below with reference to FIG. 3. As depicted in block 302, a minimum data loss tolerance and a maximum data loss tolerance are specified for a storage object. As depicted in block 304, at least one snapshot among a plurality of snapshots of the storage object are created in response to a data churn of the storage object having reached or exceeded the minimum data loss tolerance. As depicted in block 306, at least one older snapshot among the plurality of snapshots of the storage object is discarded based on whether the total data churn of the storage object in relation to two or more newer snapshots among the plurality of snapshots has reached or exceeded the maximum data loss tolerance.

Having described the above illustrative embodiments, other alternative embodiments, modifications, and/or variations can be made and/or practiced. For example, it was described herein that the Snap "N" 204 of the parent object 202 was created at the scheduled time of 20 hours, as illustrated with reference to the time axis 222 (see FIG. 2b). As an alternative or addition to the disclosed techniques, a process for creating a first snapshot of a parent object can include obtaining the allocated space on the parent object, determining whether the minimum data loss tolerance was reached or exceeded based on the amount (or percentage) of allocated space on the parent object, and, having determined that the minimum data loss tolerance was reached or exceeded, creating the first snapshot of the parent object. Such a process can be employed in a thinly provisioned data storage environment, in which the provisioned space versus the allocated space on the parent object can be readily obtained using known techniques.

It was also described herein that snapshots of a storage object in a data storage system could be managed based on the amount of data churn delta between the storage object and the respective snapshots of the storage object. As an alternative or addition to the disclosed techniques, such snapshot management can be performed taking into account not only the data churn delta, but also the metadata churn delta between the storage object and the respective snapshots of the storage object. As employed herein, the term "metadata churn" refers to the difference or change in metadata of a storage object with respect to two versions (e.g., a current version, a snapshot version) of the storage object at different points-in-time. As a further alternative or addition to the disclosed techniques, rather than employing a snapshot as the object of protection for a storage object, the object of protection can be any suitable object that allows a data churn delta to be determined, such as a block storage, a file system, and so on. Accordingly, the disclosed techniques can be employed with any suitable point-in-time (PIT) data protection mechanism, including snapshots, asynchronous replication, scheduled backups, and so on.

It was also described herein that at least one older snapshot (e.g., the Snap "N+1" 206, the Snap "N" 204; see FIG. 2b) among a plurality of successive snapshots created at a time(s) earlier than two or more newer snapshots among the plurality of successive snapshots can be archived, discarded, or moved to the lower performance tier "2" of the pool of storage devices 114 (see FIG. 1). As an alternative or addition to the disclosed techniques, (i) the Snap "N+1" 206 can be stored in the remote data storage system 122 (see FIG. 1), and any snapshots created at times earlier than the Snap "N+1" 206 (e.g., the Snap "N" 204; see FIG. 2b) can be deleted or otherwise discarded from the data storage system 104, (ii) the Snap "N+1" 206 and the Snap "N" 204 can be maintained in cloud storage and deleted or otherwise discarded from the data storage system 104, or (iii) the Snap "N+1" 206 and the Snap "N" 204 can be deleted or otherwise discarded from the data storage system 104 without being stored or otherwise maintained within the data storage environment 100.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, object storage, a virtualized device, a logical unit (LU), a logical unit number (LUN), a logical volume, a logical device, a physical device, and/or a storage medium. An LU may be a logical entity provided by a storage system for accessing data from the storage system. An LU may be used interchangeably with a logical volume. An LU or LUN may be used interchangeably with each other. A LUN may be a logical unit number for identifying an LU, and may also refer to one or more virtual disks or virtual LUNs, which may correspond to one or more virtual machines. A physical storage unit may be a physical entity, such as a drive or disk or an array of drives or disks, for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, and may include multiple levels of virtual-to-physical mappings, and may be or include an image or disk image. A storage medium may be computer-readable, and may also be referred to as a computer-readable program medium.

As employed herein, the term "IO request" or simply "IO" may be used to refer to an input or output request, such as a data read request, or a data write request.

As employed herein, the terms, "such as," "for example," "e.g.," "exemplary," and variants thereof, describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of managing copies of storage objects in a data storage system, comprising:
   specifying a maximum data loss tolerance for a parent storage object;
   for each successive copy of a plurality of successive copies of the parent storage object, determining a percentage change in data of the parent storage object up to or after a time of creation of the successive copy, the plurality of successive copies including two or more newer successive copies and at least one older successive copy of the parent storage object, the at least one older successive copy being older than the two or more newer successive copies of the parent storage object;
   obtaining a sum of the percentage changes in data of the parent storage object for the two or more newer successive copies of the parent storage object; and
   in response to the obtained sum reaching or exceeding the maximum data loss tolerance, discarding the at least one older successive copy from among the plurality of successive copies of the parent storage object.

2. The method of claim 1 further comprising:
   monitoring, during at least one predetermined time interval, the percentage change in data of the parent storage object up to or after the time of creation of the successive copy of the parent storage object.

3. The method of claim 2 further comprising:
   creating, during the at least one predetermined time interval, the successive copy in response to the monitored percentage change in data of the parent storage object having reached or exceeded a minimum data loss tolerance.

4. The method of claim 3 wherein the at least one predetermined time interval corresponds to at least one scheduled time interval for creating the successive copy of the parent storage object.

5. The method of claim 4 further comprising:
   creating at least one additional successive copy among the plurality of successive copies of the parent storage object at one or more of a beginning and an end of the scheduled time interval.

6. The method of claim 1 further comprising:
   monitoring, at predetermined time intervals, the percentage changes in data of the parent storage object for the two or more newer successive copies of the parent storage object.

7. The method of claim 1 wherein the discarding of the at least one older successive copy of the parent storage object includes one or more of (i) deleting the at least one older successive copy of the parent storage object from the data storage system, (ii) storing the at least one older successive copy of the parent storage object in a remote data storage system, and (iii) moving the at least one older successive copy of the parent storage object from a higher performance tier of the data storage system to a lower performance tier of the data storage system.

8. A data storage system comprising:
   a memory; and
   storage processing circuitry configured to execute program instructions out of the memory to:
      specify a maximum data loss tolerance for a parent storage object;
      for each successive copy of a plurality of successive copies of the parent storage object, determine a percentage change in data of the parent storage object up to or after a time of creation of the successive copy, the plurality of successive copies including two or more newer successive copies and at least one older successive copy of the parent storage object, the at least one older successive copy being older than the two or more newer successive copies of the parent storage object;
      obtain a sum of the percentage changes in data of the parent storage object for the two or more newer successive copies of the parent storage object; and
      in response to the obtained sum reaching or exceeding the maximum data loss tolerance, discard the at least one older successive copy from among the plurality of successive copies of the parent storage object.

9. The data storage system of claim 8 wherein the storage processing circuitry is further configured to execute the program instructions out of the memory to monitor, during at least one predetermined time interval, the percentage change in data of the parent storage object up to or after the time of creation of the successive copy of the parent storage object.

10. The data storage system of claim 9 wherein the storage processing circuitry is further configured to execute the program instructions out of the memory to create, during the at least one predetermined time interval, the successive copy in response to the monitored percentage change in data of the parent storage object having reached or exceeded a minimum data loss tolerance.

11. The data storage system of claim 10 wherein the at least one predetermined time interval corresponds to at least one scheduled time interval for creating the successive copy of the parent storage object.

12. The data storage system of claim 11 wherein the storage processing circuitry is further configured to execute the program instructions out of the memory to create at least one additional successive copy among the plurality of successive copies of the parent storage object at one or more of a beginning and an end of the scheduled time interval.

13. The data storage system of claim 8 wherein the storage processing circuitry is further configured to execute the program instructions out of the memory to monitor, at predetermined time intervals, the percentage changes in data of the parent storage object for the two or more newer successive copies of the parent storage object.

14. The data storage system of claim 8 wherein the storage processing circuitry is further configured to execute the program instructions out of the memory to perform one or more of (i) deleting the at least one older successive copy of the parent storage object from the data storage system, (ii) storing the at least one older successive copy of the parent storage object in a remote data storage system, and (iii) moving the at least one older successive copy of the parent storage object from a higher performance tier of the data storage system to a lower performance tier of the data storage system.

15. A computer program product including a set of non-transitory, computer-readable media having instructions that, when executed by processing circuitry of a computerized apparatus, cause the processing circuitry to perform a method of managing copies of storage objects in a data storage system, wherein the method comprises:

specifying a maximum data loss tolerance for a parent storage object;

for each successive copy of a plurality of successive copies of the parent storage object, determining a percentage change in data of the parent storage object up to or after a time of creation of the successive copy, the plurality of successive copies including two or more newer successive copies and at least one older successive copy of the parent storage object, the at least one older successive copy being older than the two or more newer successive copies of the parent storage object;

obtaining a sum of the percentage changes in data of the parent storage object for the two or more newer successive copies of the parent storage object; and in response to the obtained sum reaching or exceeding the maximum data loss tolerance, discarding the at least one older successive copy from among the plurality of successive copies of the parent storage object.

\* \* \* \* \*